(12) United States Patent
Klopfenstein et al.

(10) Patent No.: US 10,979,541 B2
(45) Date of Patent: Apr. 13, 2021

(54) SYSTEM AND METHOD FOR SETTING TIME AND DATE IN A DEVICE WITHOUT ACCESS TO NETWORK TIME PROTOCOL

(71) Applicant: INTERDIGTAL MADISON PATENT HOLDINGS, SAS, Paris (FR)

(72) Inventors: Scott Edward Klopfenstein, Fishers, IN (US); Steven True, Indianapolis, IN (US); Chad Andrew Lefevre, Indianapolis, IN (US)

(73) Assignee: Interdigital Madison Patent Holdings, SAS, Paris (FR)

( * ) Notice: Subject to any disclaimer, the term of this patent is extended or adjusted under 35 U.S.C. 154(b) by 58 days.

(21) Appl. No.: 15/572,357

(22) PCT Filed: Jun. 16, 2016

(86) PCT No.: PCT/US2016/037768
§ 371 (c)(1),
(2) Date: Nov. 7, 2017

(87) PCT Pub. No.: WO2016/205455
PCT Pub. Date: Dec. 22, 2016

(65) Prior Publication Data
US 2018/0124219 A1    May 3, 2018

Related U.S. Application Data

(60) Provisional application No. 62/180,849, filed on Jun. 17, 2015.

(51) Int. Cl.
G06F 15/16    (2006.01)
H04L 29/06    (2006.01)
(Continued)

(52) U.S. Cl.
CPC .............. *H04L 69/22* (2013.01); *H04L 69/28* (2013.01); *G04G 5/00* (2013.01); *H04J 3/0658* (2013.01); *H04L 67/02* (2013.01)

(58) Field of Classification Search
USPC ................... 709/220, 224, 244, 202
See application file for complete search history.

(56) References Cited

U.S. PATENT DOCUMENTS 7,339,886 B2 * 3/2008 Kim .................... H04W 56/009
                                            370/216
7,873,024 B1   1/2011 Fenwick et al.
(Continued)

FOREIGN PATENT DOCUMENTS

CN       1401172 A    3/2003
CN       1866830 A    11/2006
(Continued)

OTHER PUBLICATIONS

International Search Report and Written Opinion of the International Searching Authority for PCT/US2016/037768, dated Sep. 23, 2016, 12 pages.

(Continued)

*Primary Examiner* — Lan Dai T Truong
(74) *Attorney, Agent, or Firm* — Invention Mine LLC

(57) ABSTRACT

A system and method for setting time and date in a device (e.g., a set top box (614), or similar client device) through a network connection when a network time standard server (606, 620) (e.g., a NTP server) is unavailable (e.g., blocked or blacklisted) are provided. The system and method of the present disclosure involves sending (404) a request over a network from a device for information from an Internet address (618), receiving (406) a packet (500) from the Internet address (618) in response to the request, extracting (408) time and date information from a header (502) in the (Continued)

packet (500), and using the extracted time and date information to set (416) the current time and date for the device.

22 Claims, 6 Drawing Sheets

(51) Int. Cl.
    *H04J 3/06*       (2006.01)
    *G04G 5/00*       (2013.01)
    *H04L 29/08*     (2006.01)

(56) References Cited

U.S. PATENT DOCUMENTS

| | | | |
|---|---|---|---|
| 2003/0140226 A1 | 7/2003 | Yamamoto et al. | |
| 2007/0005723 A1* | 1/2007 | Kato | H04L 69/28 |
| | | | 709/217 |
| 2009/0249222 A1* | 10/2009 | Schmidt | H04N 21/4143 |
| | | | 715/751 |
| 2013/0014147 A1* | 1/2013 | Hadfield | H04N 21/44213 |
| | | | 725/14 |
| 2013/0332626 A1* | 12/2013 | Laas | H04L 61/1511 |
| | | | 709/238 |
| 2014/0195651 A1 | 7/2014 | Stockhammer et al. | |
| 2020/0092024 A1* | 3/2020 | Williams | H04L 29/0854 |
| 2020/0176095 A1* | 6/2020 | Ansari | G16H 10/60 |

FOREIGN PATENT DOCUMENTS

| | | | |
|---|---|---|---|
| CN | 101459502 A | 6/2009 | |
| WO | WO03036395 | 5/2003 | |
| WO | WO-2013003751 A1 * | 1/2013 | H04L 67/18 |

OTHER PUBLICATIONS

International Preliminary Report on Patentability for PCT/US2016/037768 dated Dec. 28, 2017, 8 pages.

* cited by examiner

SYSTEM AND METHOD FOR SETTING TIME AND DATE IN A DEVICE WITHOUT ACCESS TO NETWORK TIME PROTOCOL

CROSS-REFERENCE TO RELATED APPLICATION

This application claims the benefit, under 35 U.S.C. § 365 of International Application PCT/US16/37768, filed Jun. 16, 2016, which was published in accordance with PCT Article 21(2) on Dec. 22, 2016 in English, and which claims the benefit of U.S. Provisional Application No. 62/180,849 filed Jun. 17, 2015.

TECHNICAL FIELD

The present disclosure generally relates to digital content systems and home networking devices, and more particularly, to a system and method for setting time and date in a device without access to a time standard server.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Many home entertainment devices not only include the capability to communicate with other devices in a home network but also include the ability to receive and/or process available media content from a plurality of sources, including a plurality of providers. The sources and providers may include, but are not limited to, satellite service, cable service, and free to home over the air terrestrial service. The services may operate in the same or different frequency ranges and may use the same or different transmission formats or protocols. The devices for receiving the services often include, but are not limited to, set-top boxes, gateways, televisions, home computers, tablets, mobile phones and the like. Further, many of these devices may include multiple interfaces for different types of externally provided services as well as different types of home networks. These devices may also include additional features internal to the device, such as storage elements, hard drives, compact disk or digital versatile disk drives, and the like.

Some devices, particularly those devices that are operated as auxiliary devices connected through a network (e.g., an over-the-top (OTT) device connected to a service provider network through a Wi-Fi connection or hotspot), may be restricted in terms of access to certain network servers and locations by the service provider. In some cases, the restriction may include websites or Internet addresses associated with certain device startup operations, such as a Network Time Protocol (NTP) server. As a result, these devices may not be able to establish an accurate time and date automatically.

Therefore, a need exists for techniques for setting time and date in a device without access to a time standard server, such as the NTP server.

SUMMARY

A system and method for setting time and date in a device without access to a network based time server are provided.

According to one aspect of the present disclosure, a method for setting current time and date in a device is provided. The method includes sending a request over a network from a device for information from an Internet address, receiving a packet from the Internet address in response to the request, extracting time and date information from a header in the packet, and using the extracted time and date information to set the current time and date for the device.

According to another aspect of the present disclosure, an apparatus is provided. The apparatus includes a signal transceiver that sends a request over a network for information from an Internet address and receives a packet from the Internet address in response to the request, and a controller coupled to the signal transceiver, the controller extracting time and date information from a header in the packet and uses the extracted time and date information to set the current time and date for the apparatus.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

BRIEF DESCRIPTION OF THE DRAWINGS

These, and other aspects, features and advantages of the present disclosure will be described or become apparent from the following description of the embodiments, which is to be read in connection with the accompanying drawings.

In the drawings, wherein like reference numerals denote similar elements throughout the views.

Figure 1:
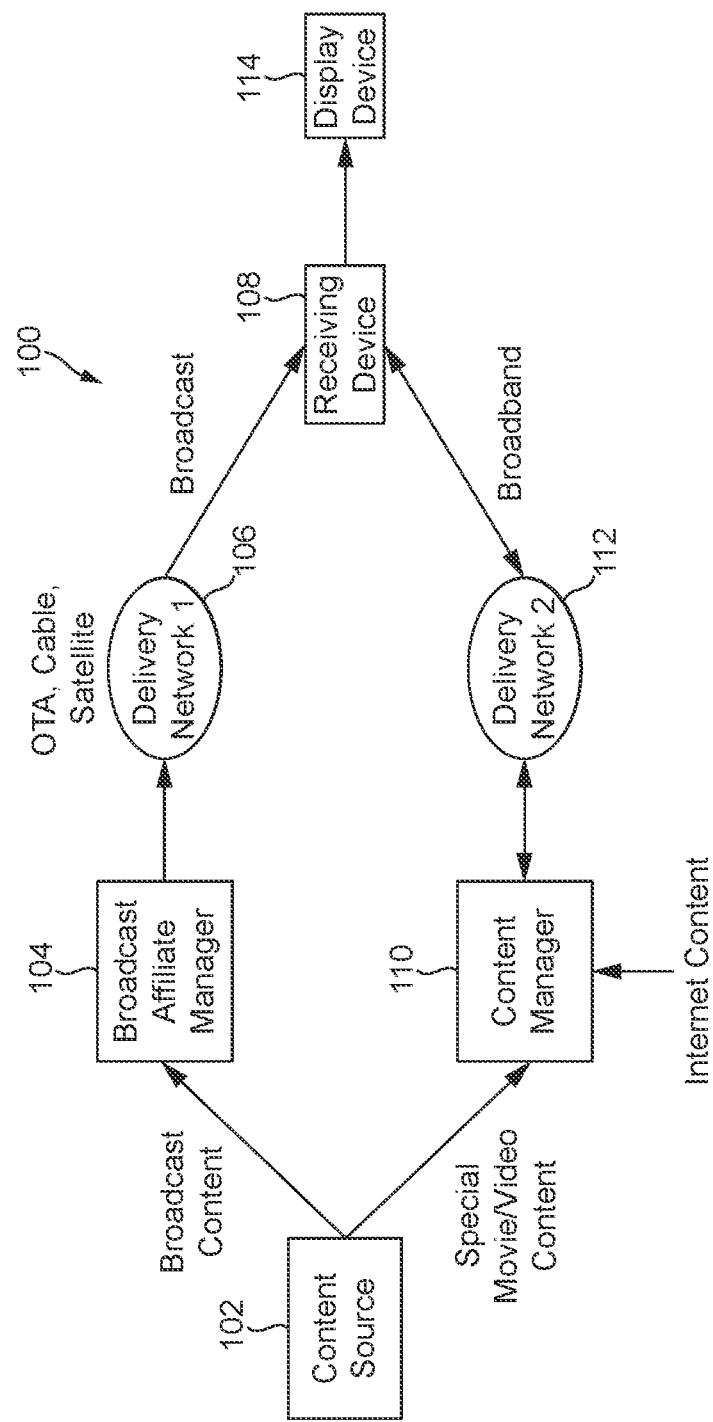
FIG. 1 is a block diagram of an exemplary system for delivering video content in accordance with the present disclosure.

It should be understood that the drawing(s) is for purposes of illustrating the concepts of the disclosure and is not necessarily the only possible configuration for illustrating the disclosure.

DESCRIPTION OF EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative system components and/or circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor", "module" or "controller" should not be construed to refer exclusively to hardware capable of executing software, and may implicitly include, without limitation, a System on a Chip (SoC), digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present disclosure is directed to a method of establishing a date and time in a device (e.g., a set top box, or similar client device) through a network connection when the usual network time server (e.g., a NTP server) is unavailable (e.g., blocked or blacklisted). The NTP server may be unavailable when the service provider provides "over the top" content access through its network and/or a local network (e.g., a Wi-Fi connected client box connected to a service provider gateway through a home network) and considers the NTP server as a security risk. The system and method of the present disclosure involves requesting access to an Internet address (e.g., a website having an address, a uniform resource locator (URL), or similar) and then stripping or extracting the time/date information from a header in a return packet. In one embodiment, the return packet will include little or no information so that no further processing will be needed or occur in the device and minimal network bandwidth is used.

Initially, systems for setting the time and date in a device without access to a time standard server, such as NTP will be described. Subsequently, a method for setting the time and date in a device without access to NTP in accordance with embodiments of the present disclosure will then be detailed.

Turning now to FIG. 1, a block diagram of an embodiment of a system 100 for delivering content to a home, device, end user, etc. is shown. The content originates from a content source 102, such as a movie studio or production house. The content may be supplied in at least one of two forms. One form may be a broadcast form of content. The broadcast content is provided to the broadcast affiliate manager 104, which is typically a national broadcast service, such as the American Broadcasting Company (ABC), NBC, CBS, etc. The broadcast affiliate manager may collect and store the content, and may schedule delivery of the content over a deliver network, shown as delivery network 1 (106). Delivery network 1 (106) may include satellite link transmission from a national center to one or more regional or local centers. Delivery network 1 (106) may also include local content delivery using local delivery systems such as over the air broadcast, satellite broadcast, or cable broadcast. The locally delivered content is provided to a receiving device 108, e.g., a user's set-top box/digital video recorder (DVR) in a user's home, a tablet computing device, etc., where the content will subsequently be presented to the user.

A second form of content is referred to as special content. Special content may include content delivered as premium viewing, pay-per-view, or other content otherwise not provided to the broadcast affiliate manager. In many cases, the special content may be content requested by the user. The special content may be delivered to a content manager 110. The content manager 110 may be a service provider, such as an Internet website, affiliated, for instance, with a content provider, broadcast service, or delivery network service. The content manager 110 may also incorporate Internet content into the delivery system, or explicitly into a search only such that content may be searched that has not yet been delivered to the receiving device 108. The content manager 110 may deliver the content to the user's receiving device 108 over a separate delivery network, delivery network 2 (112). Delivery network 2 (112) may include high-speed broadband Internet type communications systems. It is important to note that the content from the broadcast affiliate manager 104 may also be delivered using all or parts of delivery network 2 (112) and content from the content manager 110 may be delivered using all or parts of Delivery network 1 (106). In addition, the user may also obtain content directly from the Internet via delivery network 2 (112) without necessarily having the content managed by the content manager 110.

The receiving device 108, e.g., a set-top box/digital video recorder, may receive different types of content from one or both of delivery network 1 and delivery network 2. The receiving device 108 processes the content, and provides a separation of the content based on user preferences and commands. The receiving device 108 may also include a storage device, such as a hard drive or optical disk drive, for recording and playing back audio and video content. Further details of the operation of the receiving device 108 and features associated with playing back stored content will be described below in relation to FIG. 2. The processed content is provided to a display device 114. The display device 114 may be a conventional 2-D type display or may alternatively be an advanced 3-D display. In certain embodiments, the receiving device 108 and display device 114 may be configured in a single device, for example, an integrated television, a tablet computing device, laptop, etc. It should be appreciated that other devices having display capabilities such as wireless phones, PDAs, computers, gaming platforms, remote controls, multi-media players, or the like, may employ the teachings of the present disclosure and are considered within the scope of the present disclosure.

Figure 2:
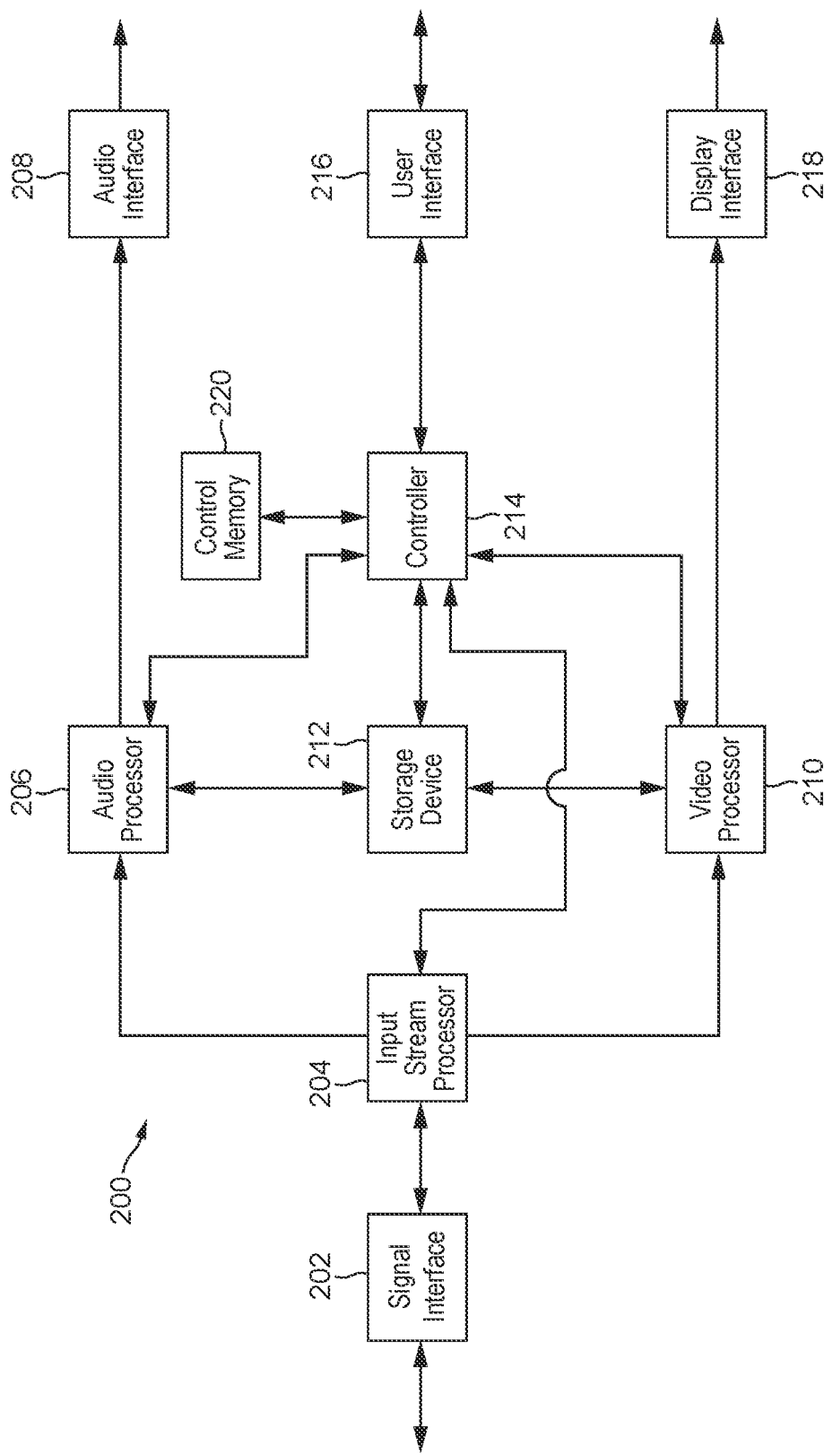
FIG. 2 is a block diagram of an exemplary receiving device in accordance with the present disclosure.

Turning now to FIG. 2, a block diagram of an embodiment of the core of a receiving device 200 is shown. Device 200 may operate in a manner similar to receiving device 108 described in FIG. 1. The device 200 shown may also be incorporated into other systems, including a display device (e.g., display device 114 described in FIG. 1). In either case, several components necessary for complete operation of the system are not shown in the interest of conciseness, as they are well known to those skilled in the art.

In the device 200 shown in FIG. 2, the content is received in a signal interface 202. The signal interface 202 may be one of several known receiver circuits used for receiving, demodulation, and decoding signals provided over one of the several possible networks including over the air, cable, satellite, Ethernet, wireless Ethernet, WiFi, fiber and phone line networks. The desired input signal may be selected and retrieved in the signal interface 202 based on user input provided through a control interface (not shown). It is to be appreciated that the signal interface 202 may in certain embodiments be a signal transceiver for two way communication to and from the receiving device 200. In certain embodiments, the transceiver will output information, e.g., a search request to delivery network 2 (112) to search for Internet content, feedback from a user in response to displaying of items such as video, a request for information from a specific Internet address (e.g., a website, URL or similar), a request for a time and date from an NTP server, etc.

The decoded output signal from the signal interface 202 is provided to an input stream processor 204. The input stream processor 204 performs the final signal selection and processing, and includes separation of video content from audio content for the content stream. The audio content is provided to an audio processor 206 for conversion from the received format, such as compressed digital signal, to an analog waveform signal. The analog waveform signal is provided to an audio interface 208 and further to the display device 114 or an audio amplifier (not shown). Alternatively, the audio interface 208 may provide a digital signal to an audio output device or display device using a High-Definition Multimedia Interface I (HDM) cable or alternate audio interface such as via a Sony/Philips Digital Interconnect Format (SPDIF). The audio processor 206 also performs any necessary conversion for the storage of the audio signals.

The video output from the input stream processor 204 is provided to a video processor 210. The video signal may be one of several formats. The video processor 210 provides, as necessary a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., navigation instructions such as fast-forward (FF) and rewind (Rew), received from a user interface 216. The storage device 212 may be a hard disk drive, one or more large capacity integrated electronic memories, such as static random access memory, or dynamic random access memory, or may be an interchangeable optical disk storage system such as a compact disk drive or digital video disk drive.

The converted video signal, from the video processor 210, either originating from the input or from the storage device 212, is provided to the display interface 218. The display interface 218 further provides the display signal to a display device of the type described above. The display interface 218 may be an analog signal interface such as red-green-blue (RGB) or may be a digital interface such as high definition multimedia interface (HDMI). It is to be appreciated that the display interface 218 will generate the various screens for presenting recommendations as will be described in more detail below.

The controller 214 is interconnected via a bus to several of the components of the device 200, including the signal interface 202, input stream processor 204, audio processor 206, video processor 210, storage device 212, and a user interface 216. The controller 214 manages the conversion process for converting the input stream signal into a signal for storage on the storage device or for display. The controller 214 also manages the retrieval and playback of stored content. The controller 214 is further coupled to control memory 220 (e.g., volatile or non-volatile memory, including random access memory, static RAM, dynamic RAM, read only memory, programmable ROM, flash memory, EPROM, EEPROM, etc.) for storing information and instruction code for controller 214. Further, the implementation of the memory may include several possible embodiments, such as a single memory device or, alternatively, more than one memory circuit connected together to form a shared or common memory. Still further, the memory may be included with other circuitry, such as portions of bus communications circuitry, in a larger circuit.

Figure 3A:
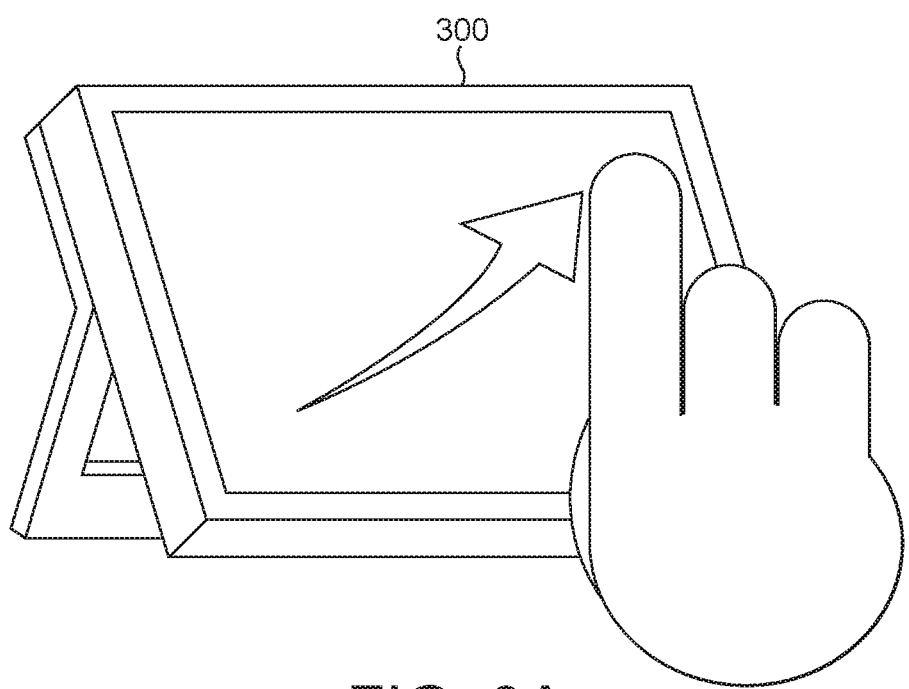
FIG. 3A is a perspective view of a touch panel or interface in accordance with the present disclosure.

To operate effectively, the user interface 216 of the present disclosure employs an input device that moves a cursor around the display. To further enhance the user experience and to facilitate the display of, and navigation around, a database such as a movie library, a touch panel device 300 may be interfaced to the receiving device 108, 200 as shown in FIG. 3A. The touch panel device 300 allows operation of the receiving device 108, 200 based on hand movements, or gestures, and actions translated through the panel into commands for the receiving device. In one embodiment, the touch panel 300 may simply serve as a navigational tool to navigate a collection of items such as movie posters. In other embodiments, the touch panel 300 will additionally serve as the display device allowing the user to more directly interact with the navigation through the display of content.

Alternatively, a mouse device, a remote control with navigation features, or gesture based remote control may also be used, as will be described below.

The user interface control may be included as part of the receiving device 108, and incorporates features useful for display and navigation through a grid representing content in a database as well for video display of content. The user interface, and more specifically the grid user interface element, is incorporated into a video media player interface that includes scripting or programming capability for manipulation of graphics. The video media player and interface may be implemented in the receiving device 108, 200 using any combination of hardware, software, or firmware. Alternatively, some portion of the control and video display operation may be included in the touch panel device 300 and also may be part of the information transmitted across the network.

Figure 3B:
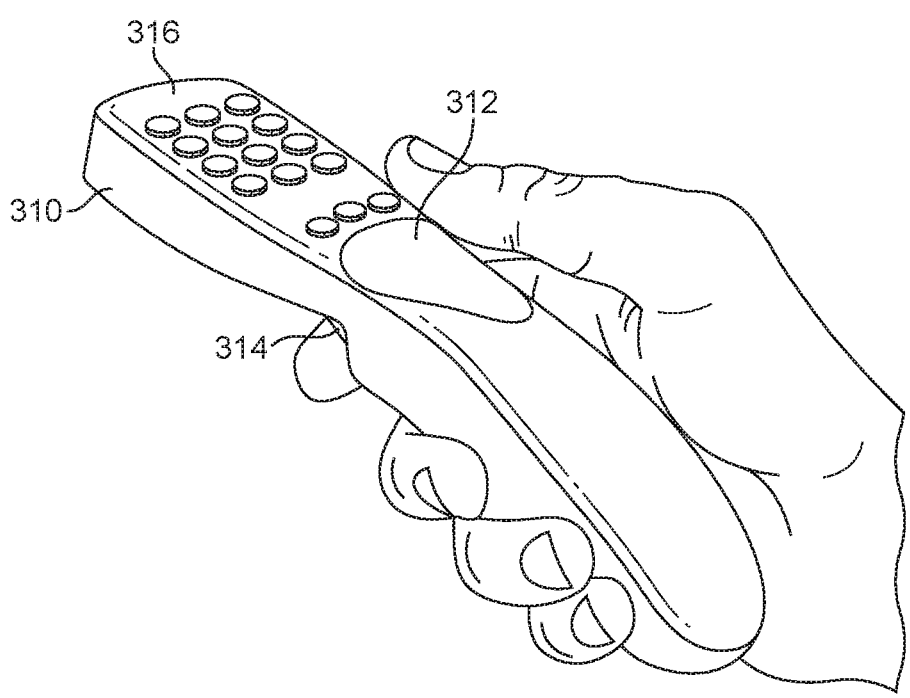
FIG. 3B is a perspective view of an exemplary remote controller in accordance with an embodiment of the present disclosure.

In another embodiment, the input device is a remote controller, with a form of motion detection, such as a gyroscope or accelerometer, which allows the user to move a cursor freely about a screen or display. An exemplary hand-held angle-sensing remote controller 310 is illustrated in FIG. 3B. Remote controller 310 includes a thumb button 312, positioned on the top side of controller 310 so as to be selectively activated by a user's thumb. Activation of thumb button 312 will also be referred to as a "click," a command often associated with activation or launch of a selected function. Controller 310 further includes a trigger button 314, positioned on the bottom side of controller 310 so as to be selectively activated by a user's index (or "trigger") finger. Activation of trigger button 314 will also be referred to as a "trigger," and angular movement (i.e. pitch, yaw and/or roll) of the controller 310 while the trigger is depressed will be referred to as a "trigger-drag." A trigger-drag command is often associated with movement of a cursor, virtual cursor or other indication of the user's interactive position on the display, such as a change of state (i.e., a highlighted or outlined cell), and is commonly used to navigate in and select entries from the interactive display. Additionally, a plurality of buttons 306 are provided for entering numbers and/or letters. In one embodiment, the plurality of buttons 316 is configured similar to a telephone-type keypad.

The use of a hand-held angle-sensing remote controller provides for a number of types of user interaction. When using an angle-sensing controller, changes in yaw map to left-and-right motions, changes in pitch map to up-and-down motions and changes in roll map to rotational motions along a longitudinal axis of the controller. These inputs are used to define gestures and the gestures, in turn, define specific contextual commands. As such, a combination of yaw and pitch can be used to define any 2-dimensional motion, such as a diagonal, and a combination of yaw, pitch and roll can be used to define any 3-dimensional motion, such as a swing.

It is to be appreciated that at least some of the components described above in relation to FIGS. 1-3 will form an apparatus and/or system for setting a time and date in a device that does not have access to NTP or an NTP server. It is further to be appreciated that the teachings of the present disclosure may be used in any number of devices, including a set-top box (e.g., an OTT (over the top) box that uses Wi-Fi or other secondary or local network access mechanism to a service provider network). Other devices that may employ the teachings of the present disclosure include any Internet connected device that requires a correct time/date, for example, a computer, laptop, tablet, smartphone, gaming platform, etc.

Figure 4:
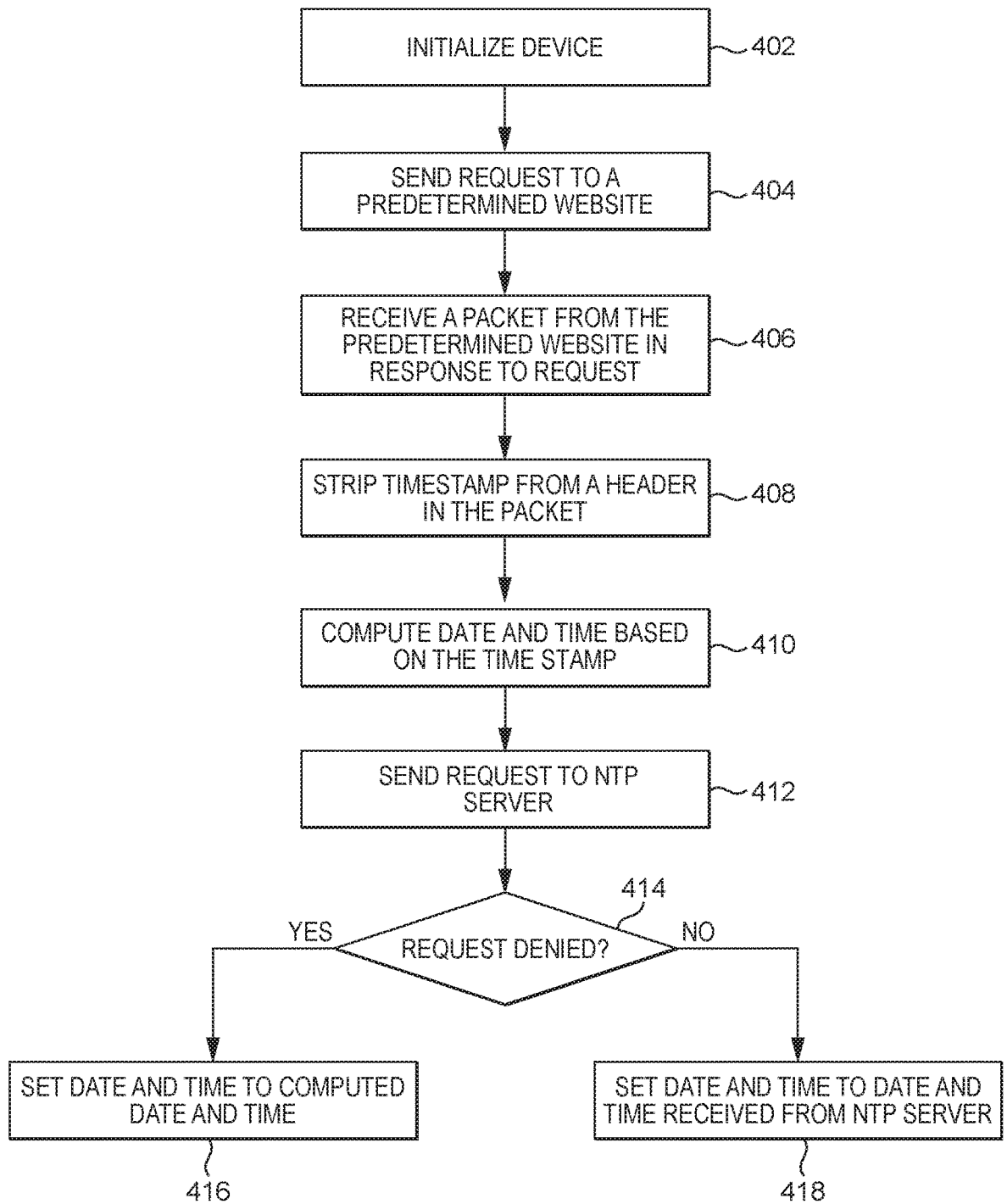
FIG. 4 is a flowchart of an exemplary method for setting time and date in a device without access to Network Time Protocol (NTP) in accordance with an embodiment of the present disclosure.
Figure 5:
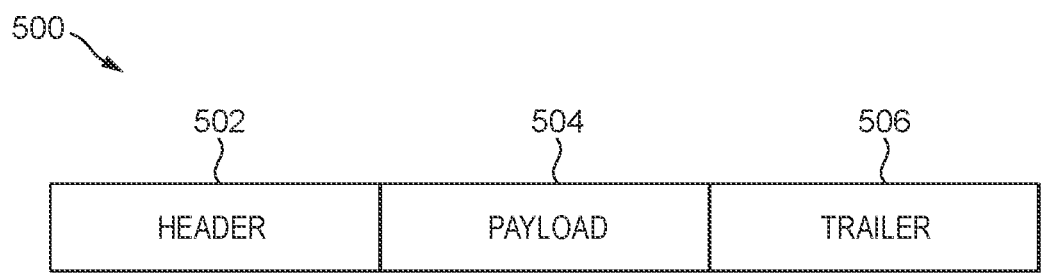
FIG. 5 illustrates an exemplary packet in accordance with an embodiment of the present disclosure.

The date/time is normally set through access to an NTP server. However, for any number of reasons, the NTP server may be access restricted, or blacklisted, by the service provider when access is requested from a device through the secondary or local network. A method for setting the time and date in a device without access to NTP or any other time standard server in accordance with the present disclosure will now be described in relation to FIGS. 4 and 5, where FIG. 4 is a flowchart of an exemplary method for setting the time and date and FIG. 5 illustrates an exemplary packet. It is to be appreciated that the device referred to in FIG. 4 may be configured similar to receiving device 108, 200.

Referring to FIG. 4, a device is initialized, in step 402. In step 404, the device sends a request to a predetermined Internet address or website, via a transceiver (e.g., signal interface 202 described in FIG. 2). For example, the request may be a standard HTTP GET request, although any Hypertext Transfer Protocol (HTTP) request will prompt a proper response and is contemplated to be within the scope of the present disclosure. Any website's response or response from an Internet address will contain a timestamp or other time/date information; however, it may be desirable for a service provider or product manufacturer to maintain a specific website with a sole purpose to provide time/date information. Additionally, to ensure the website remains active, the service provider or product manufacturer may designate a specific or predetermined website that the service provider or product manufacturer can control.

In step 406, the signal transceiver of the device receives a return message, e.g., a packet 500 shown in FIG. 5, from the Internet address or website in response to the request. The packet 500 includes a header 502, a payload 504 and, optionally, a trailer 506. In step 408, the controller 214 of the device strips or extracts a timestamp from the header 502 in the packet 500. The packet is a standard website server response to an incoming HTTP GET request. In one embodiment, the response is an HTML/text response, where part of the textual information is a time/date.

In step 410, the controller 214 of the device computes the date and time according to the following equation:

time=time stripped from timestamp+offset

In one embodiment, the offset is a time zone offset based on a location of the device. The Internet address or website response will be the time/date in GMT (Greenwich Mean Time) format. An offset is applied to the time stripped from the header to set the local time. It is to be appreciated that the offset may be predetermined by a user or other method. For example, the offset may be determined from a user setup procedure where a user is prompted to enter, among other inputs, a geographic location, a time zone, etc. In another embodiment, the device may include a location services device or component, e.g., a GPS (global positioning system) receiver, to determine the location of the device for selecting the proper time zone or offset.

In step 412, the signal transceiver of the device then sends a request for the time and date to a known NTP server. It is to be appreciated that an address or URL of the NTP server is predetermined and stored in the device. The known NTP server may be established by the service provider and reside on the network of the service provider. Alternatively, the known NTP server may be a publically available NTP server on the Internet. If the request is denied in step 414 (e.g., the NTP server site is restricted or blacklisted), then the controller 214 of the device sets the date and time to the computed date and time (i.e., the date and time computed in step 410) based on the packet, in step 416. Alternatively, if a return message is received from the NTP server (including time/date) in step 414, then controller 214 of the device replaces the time/date with the new input received from the NTP server, in step 418. It is to be appreciated the process described in FIG. 4 may be initiated upon start up or power up of the device, upon a device reset, may be performed continuously at a predetermined interval, or any combination thereof.

If a website is used for time/date, it may be valuable to assure the website returns little or no information, i.e., there is no data in the payload 504 of packet 500. Ideally, only a header and an indication of no additional content or a similar indication is returned in the packet. It is to be appreciated that sending a request to the specific website before sending the request to the NTP server (as is done in the method described in relation to FIG. 4) will result in a quicker update time since if an NTP service is blocked, then a request to retrieve the time over NTP will take longer than the HTTP request. It is also possible to go out to the website after an attempt to access the NTP server, but doing so will slow the startup of the device (depending on time allocated to wait for access/return message, etc). Further, the use of a website requires no additional service (e.g., an email service) to be initiated in the device. A URL request is simpler and quicker to initiate and produce a response than other operations and services available for use.

It is to be appreciated that any Internet address for prompting a response can be used in accordance with the teachings of the present disclosure. In one embodiment, the request is sent for a specific web page on a predetermined server, or for a specific website, residing on a network, for example, at a specific URL. In this embodiment, the device purposely makes a request for an HTML page that does not exist on the server, i.e., a non-existent web page. This ensures that the minimum amount of information is sent back to the device. In this case, the server replies with an HTTP error code (e.g., page doesn't exist) or an indication of an invalid request, and a server time stamp. The time/date can be stripped or extracted from any server response packet that contains a timestamp.

Figure 6:
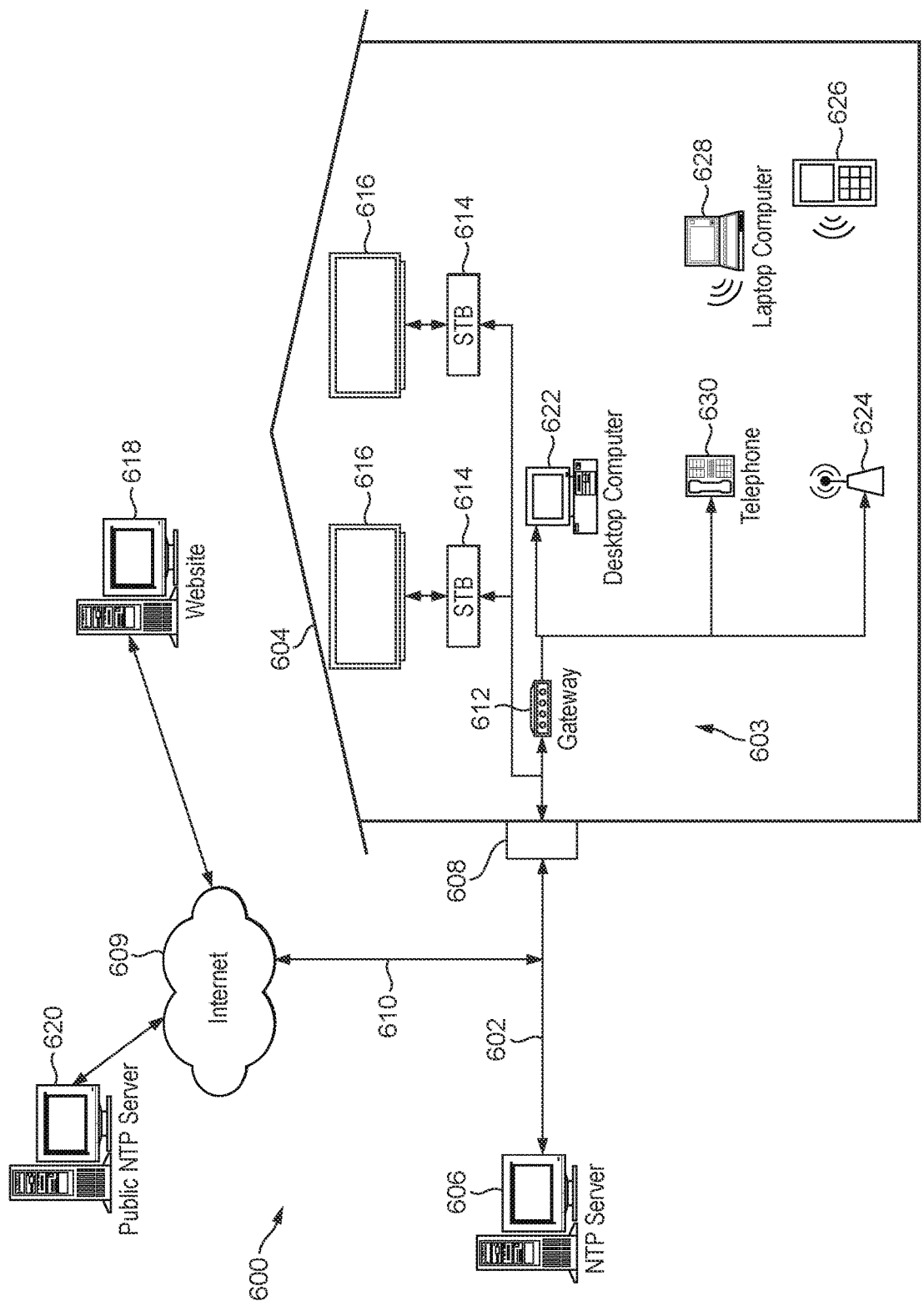
FIG. 6 illustrates an exemplary information distribution network for delivering services in accordance with the present disclosure.

Referring to FIG. 6, an exemplary information distribution network 600 employing the teachings of the present disclosure is illustrated. Network 600 may be any type of home distribution network, such as satellite, telephone, cellular, wireless network, etc. The example illustrated may be a hybrid fiber/coax distribution network found in many cable television networks. Such networks 600 use a series of interconnected transmission lines 602, such as coaxial cables fiber optic cables, or any other desired transmission medium, to connect multiple homes 604 to a central office or headend (not shown). The headend may transmit downstream information signals onto the lines 602, and each home 604 may have a tuner used to receive and process those signals.

It is to be appreciated that transmission lines 602 may form a service provider network or a wide area network managed by the service provider. The service provider network 602 further includes an NTP server 606 for providing time and date information via Network Time Protocol (NTP). The service provider network 602 may be coupled to other networks, for example, the Internet 609, via transmission line 610.

The home 604 may be connected to the network 600 via an interface 608. The transmission line (coaxial, fiber, etc.) may be connected to a home gateway device 612. The gateway device 612 may be a computing device configured to communicate over the network 600 and with the headend. The gateway 612 may include, for example, a modem configured to communicate with a termination system at the headend.

The incoming line or service provider network 602 may also be connected to one or more network interface devices 614, which can be set-top boxes (STBs), digital video recorders (DVRs), etc. The STBs 614 may receive and decode content via the line 602 (e.g., optical, coaxial, etc.), and may provide that content to users for consumption, such as for viewing video content on a television 616. Alternatively, televisions, or other viewing devices 616, may be connected to transmission line 602 directly without a STB, and may perform the functions of a STB. Any type of content, such as video, video on demand, audio, Internet data etc., can be accessed in this manner. As an alternative, the STB functionality can be incorporated with the gateway, so that the gateway 612 receives and decodes content from the line, and supplies the content to the televisions for display using any desired local home physical interface.

In one embodiment, the STB 614 sends a request (e.g., a HTTP GET request) to a predetermined Internet address 618 (for example, for a website) on the Internet 609. An address, e.g., a URL, of the predetermined website may be preprogrammed in the STB 614. The STB 614 receives a return message, e.g., a packet 500 shown in FIG. 5, from the Internet address 618 in response to the request. The STB 614 strips or extracts a timestamp from a header in the packet and computes the time with an offset as described above. Next, the STB 614 sends a request for the time and date to a known NTP server, e.g., NTP server 606. It is to be appreciated that an address or URL of the NTP server 606 is predetermined and stored in the device. The known NTP server 606 may be established by the service provider and reside on the network 602 of the service provider. Alternatively, the known NTP server may be a publically available NTP server 620 on the Internet 609. If the request is denied, STB 614 sets the date and time to the computed date and time based on the packet. If a return message is received from the NTP server 618, 620, STB 614 replaces the time/date with new input received from the NTP server 618, 620.

It is to be appreciated that other devices in the network 600 may employ the teachings of the present disclosure including any Internet connected device that requires a correct time/date, for example, a computer, laptop, tablet, smartphone, gaming platform, etc.

The gateway 612 may be connected to a variety of devices within the home 604 forming a home network 603, and may coordinate communications among those devices, and between the devices and networks outside the home 604. For example, the gateway 612 may include a modem (e.g., a Data Over Cable Service Interface Specification (DOCSIS) device communicating with a cable modem termination system (CMTS)), and may offer Internet connectivity to one or more computers 622 within the home. The connectivity may also be extended to one or more wireless routers 624. For example, router 624 may be an Institute of Electrical and Electronics Engineers (IEEE) standard 802.11 router, local cordless telephone (e.g., Digital Enhanced Cordless Telephone—DECT), or any other desired type of wireless network. Various wireless devices within the home, such as a DECT phone 626 (or a DECT interface within a cordless telephone) and portable laptop computer 628, may communicate with the gateway 612 using wireless router 624. It is to be appreciated that the router may be integrated into the gateway 612 eliminating the need for a separate router 624.

The gateway 612 may also include one or more telephone interfaces, to allow the gateway 612 to communicate with one or more telephones 630. Telephones 630 may be a traditional analog twisted pair telephone (in which case the gateway 612 may include a twisted pair interface), or it may be a digital telephone such as a Voice Over Internet Protocol (VoIP) telephone, in which case the phone 630 may simply communicate with the gateway 612 using a digital interface, such as an Ethernet interface.

The gateway 612 may communicate with the various devices within the home 604 using any desired connection and protocol. For example, an in-home Multimedia Over Coax Alliance (MoCA) network may use a home's internal coaxial cable network to distribute signals to the various devices in the homes. Alternatively, some or all of the connections may be of a variety of formats (e.g., MoCA, Ethernet, HDMI, Digital Video Interactive (DVI), twisted pair, etc.), depending on the particular end device being used. The connections may also be implemented wirelessly, using local Wi-Fi, WiMax, Bluetooth, or any other desired wireless format.

In one embodiment, the gateway 612 is configured to provide the service of an NTP server in addition to the other services described above. In this embodiment, the predetermined website address for sending the request to an NTP server is associated with the gateway 612 and is stored in the various devices shown in FIG. 6, e.g., STB 614, computer 622, laptop computer 628, etc. Here, the various devices are configured to perform or execute the method described above in relation to FIG. 4. For example, computer 622 send a request to predetermined website 618 as described above via access to the Internet provided by the gateway 612 or other means. Then, the computer 622 sends a request to a known NTP server, in this example, residing in the gateway 612. The remaining steps of the method are as described in FIG. 4.

In other embodiments, the gateway 612 hosts the predetermined website 618. In this embodiment, the predetermined website address for sending the request is associated with the gateway 612 and is stored in the various devices shown in FIG. 6, e.g., STB 614, computer 622, laptop computer 628, etc. Here, the various devices are configured to perform or execute the method described above in relation to FIG. 4. For example, computer 622 send a request to predetermined website 618 which is being hosted by the gateway 612. Then, the computer 622 sends a request to a known NTP server 606, 620. The remaining steps of the method are as described in FIG. 4.

In another embodiment, the gateway 612 is configured to perform or execute the method described above in relation to FIG. 4. For example, gateway 612 sends a first request to predetermined website 618 as described above. Then, the gateway 612 sends a second request to a known NTP server, in this example, residing in the gateway 612. Once the gateway 612 updates the time/date, the gateway 612 provides the updated time/date to the various devices on the home network 603.

In a further embodiment, the various devices shown in FIG. 6, e.g., STB 614, computer 622, laptop computer 628, etc., are each configured to individually perform or execute the method described above in relation to FIG. 4, where the gateway 612 is employed simply to provide Internet access to each device. In this embodiment, the various devices send a first request to the predetermined website or Internet address 618 and the second request to a known NTP server 618, 620. In a further embodiment, the various devices access the Internet by means other than the gateway 612, for example, such as satellite, telephone, cellular, wireless network, etc.

In an embodiment, a method may include sending a request over a network from a device for information from an Internet address, receiving a packet from the Internet address in response to the request, extracting time and date information from a header in the packet, and using the extracted time and date information to set the current time and date for the device.

In some embodiments, the method may also include sending a request for the time and date to a network time protocol server over the network, receiving a response over the network, determining if the response is a response from the network time protocol server, and replacing the current time and date for the device with the time and date information from the received response if the response is a response from the network time protocol server.

In some embodiments, the method may also include not replacing the current time and date for the device if the response is not from the network time protocol server.

In some embodiments, the method may also include computing the current time to include the time information from the packet plus an offset, wherein the offset is based on a geographic location for the device.

In an embodiment a device may include a signal transceiver that sends a request over a network for information from an Internet address and receives a packet from the Internet address in response to the request, and a controller coupled to the signal transceiver, the controller extracting time and date information from a header in the packet and uses the extracted time and date information to set the current time and date for the apparatus.

In some embodiments, the signal transceiver is further configured to send a request for the time and date to a network time protocol server over the network and receive a response over the network and wherein the controller is further configured to determine if the response is a response from the network time protocol server and to replace the current time and date for the device with the time and date information from the received response if it is determined that the response is a response from the network time protocol server.

In some embodiments, the controller further does not update the current time and date for the device if the response is not from the network time protocol server.

In some embodiments, the controller is further configured to compute the current time to include the time information from the packet plus an offset, wherein the offset is based on a geographic location for the device.

In some embodiments, the received packet contains no additional data other than the time and date information.

In some embodiments, the received packet includes an indication of an invalid request.

In some embodiments, the Internet address is an address associated with a gateway device connected to a home network and wherein the device is also connected to the home network.

In some embodiments, the device connects to a gateway device through a home network and the gateway device connects to the Internet through a wide area network managed by a service provider.

In some embodiments, sending the request includes sending a request for a non-existent page for the Internet address.

In some embodiments, the request is a Hypertext Transfer Protocol (HTTP) request.

In some embodiments, the device is a set top box.

It is to be appreciated that the various features shown and described are interchangeable, that is a feature shown in one embodiment may be incorporated into another embodiment. Further, except as specifically described above, one or more of the various features shown and described may be combined with each other as well as represent alternatives. For example, as described above, a packet received from a website may include an indication of an invalid request and/or contain only information for the time and date in the header for the packet.

Although embodiments which incorporate the teachings of the present disclosure have been shown and described in detail herein, those skilled in the art can readily devise many other varied embodiments that still incorporate these teachings. Having described preferred embodiments of a system and method for setting time and date in a device without access to a standard time server, such as Network Time Protocol (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method comprising:
sending a request over a network from a device for information from an Internet address, wherein the request is sent when a network time protocol server is unavailable to the device;
receiving a packet from the Internet address in response to the request;
extracting time and date information from the packet; and
using the extracted time and date information to set a current time and date for the device.

2. The method of claim 1, wherein the received packet contains no additional data other than the time and date information.

3. The method of claim 1, wherein the received packet includes an indication of an invalid request.

4. The method of claim 1, wherein the Internet address is an address associated with a gateway device connected to a home network and wherein the device is also connected to the home network.

5. The method of claim 1, further comprising:
sending a request for the time and date information to a network time protocol server over the network;
receiving a response over the network;
determining if the response is a response from the network time protocol server; and
replacing the current time and date for the device with the time and date information from the received response if the response is a response from the network time protocol server.

6. The method of claim 5, further comprising not replacing the current time and date for the device if the response is not from the network time protocol server.

7. The method of claim 1, wherein sending the request includes sending a request for a non-existent page for the Internet address.

8. The method of claim 1, further comprising computing the current time to include the time information from the packet plus an offset, wherein the offset is based on a geographic location for the device.

9. The method of claim 1, wherein the device is a set top box.

10. The method of claim 1, wherein the time and date information are in a header in the packet.

11. An apparatus comprising:
a signal transceiver arranged to send a request over a network for information from an Internet address and to receive a packet from the Internet address in response to the request, wherein the signal transceiver is further arranged to send the request when a network time protocol server is unavailable to the device; and
a controller coupled to the signal transceiver, the controller arranged to extract time and date information from the packet and to use the extracted time and date information to set a current time and date for the apparatus.

12. The apparatus of claim 11, wherein the received packet contains no additional data other than the time and date information.

13. The apparatus of claim 11, wherein the received packet includes an indication of an invalid request.

14. The apparatus of claim 11, wherein the Internet address is an address associated with a gateway device connected to a home network and wherein the apparatus is also connected to the home network.

15. The apparatus of claim 11, wherein the signal transceiver is further arranged to send a request for the time and date information to a network time protocol server over the network and receive a response over the network and wherein the controller is further arranged to determine if the response is a response from the network time protocol server and to replace the current time and date for the apparatus with the time and date information from the received response if the response is determined to be a response from the network time protocol server.

16. The apparatus of claim 15, wherein the controller is further arranged to not update the current time and date for the apparatus if the response is not from the network time protocol server.

17. The apparatus of claim 11, wherein the apparatus is arranged to connect to a gateway device through a home network and the gateway device is arranged to connect to the Internet address through a wide area network managed by a service provider.

18. The apparatus of claim 11, wherein the signal transceiver is arranged to send a request for a non-existent page for the Internet address.

19. The apparatus of claim 11, wherein the controller is further arranged to compute the current time to include the time information from the packet plus an offset, wherein the offset is based on a geographic location for the apparatus.

20. The apparatus of claim 11, wherein the time and date information are in a header in the packet.

21. The apparatus of claim 11, wherein the apparatus is a set top box.

22. The method of claim 1, wherein the Internet address is any Internet address.

* * * * *